L. MAISEL.
PROCESS AND APPARATUS FOR MAKING BATTERY ELECTRODES.
APPLICATION FILED OCT. 11, 1918.
1,375,305.
Patented Apr. 19, 1921.
3 SHEETS—SHEET 2.
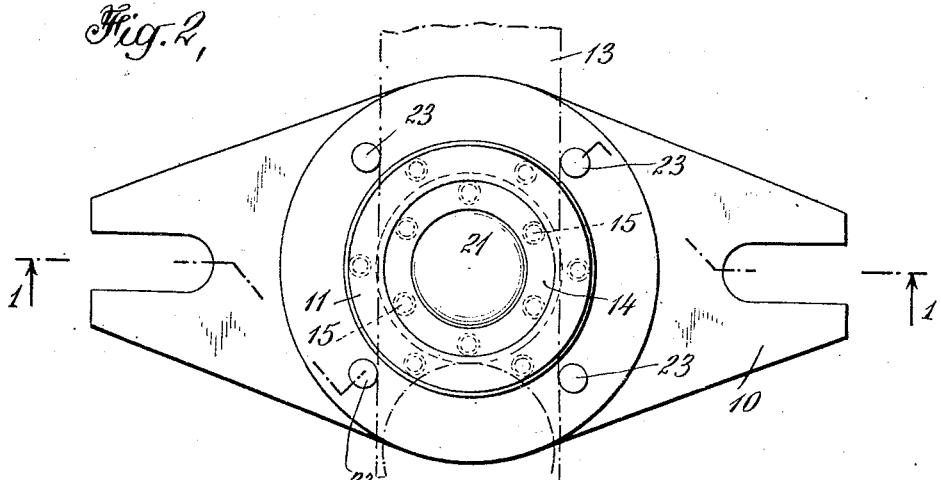
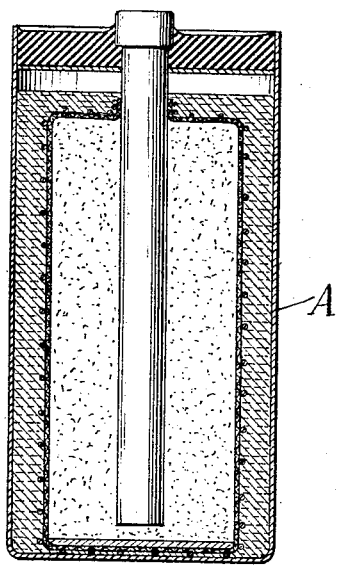
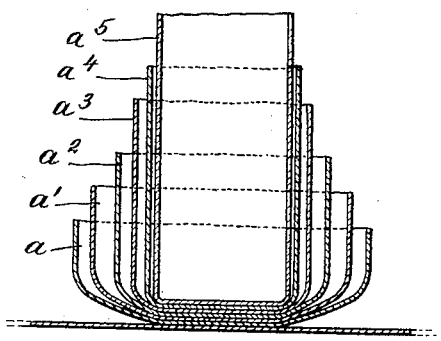
INVENTOR
Lorenz Maisel
BY
Pennie Davis Marvin & Edmonds
ATTORNEYS.

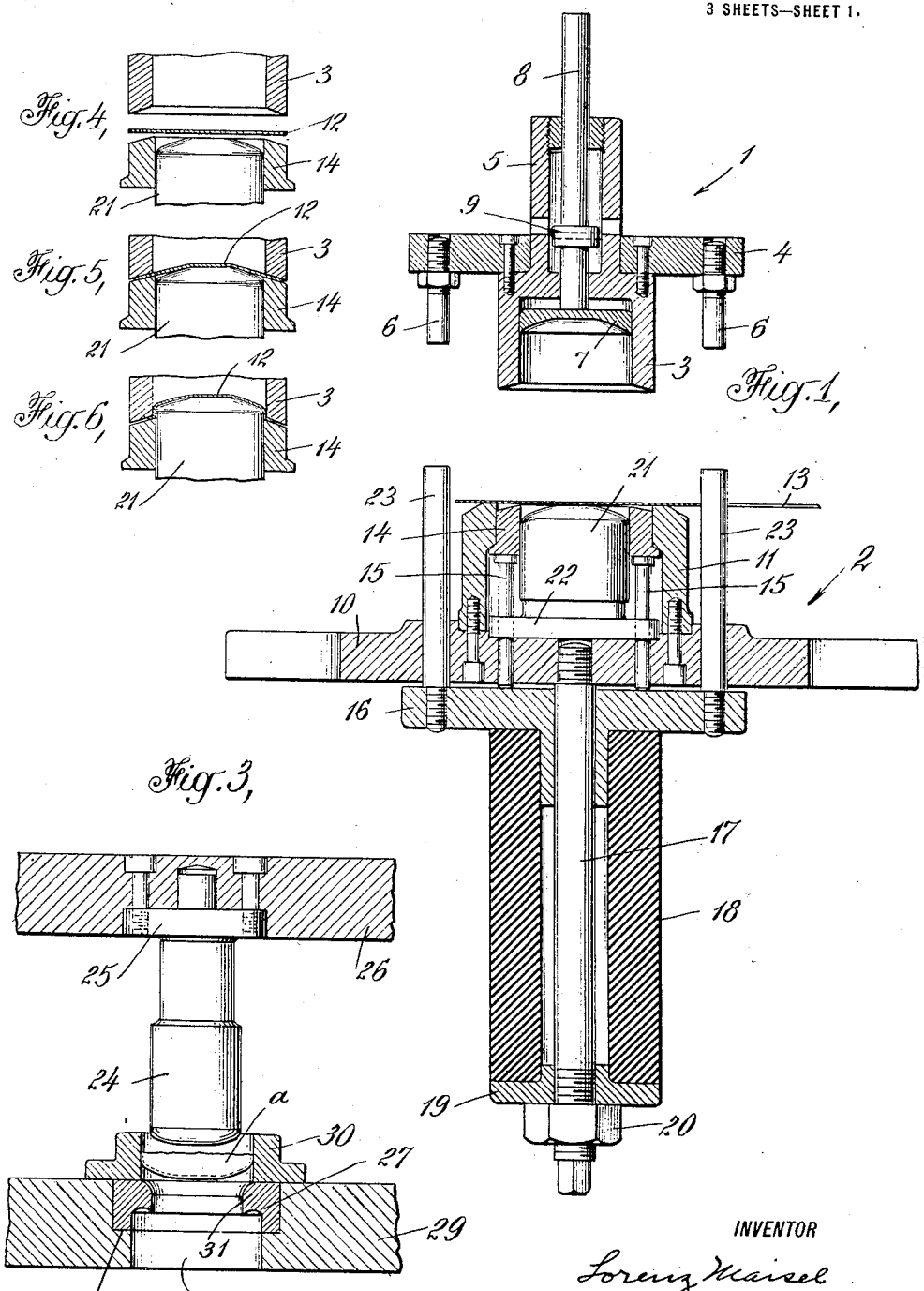

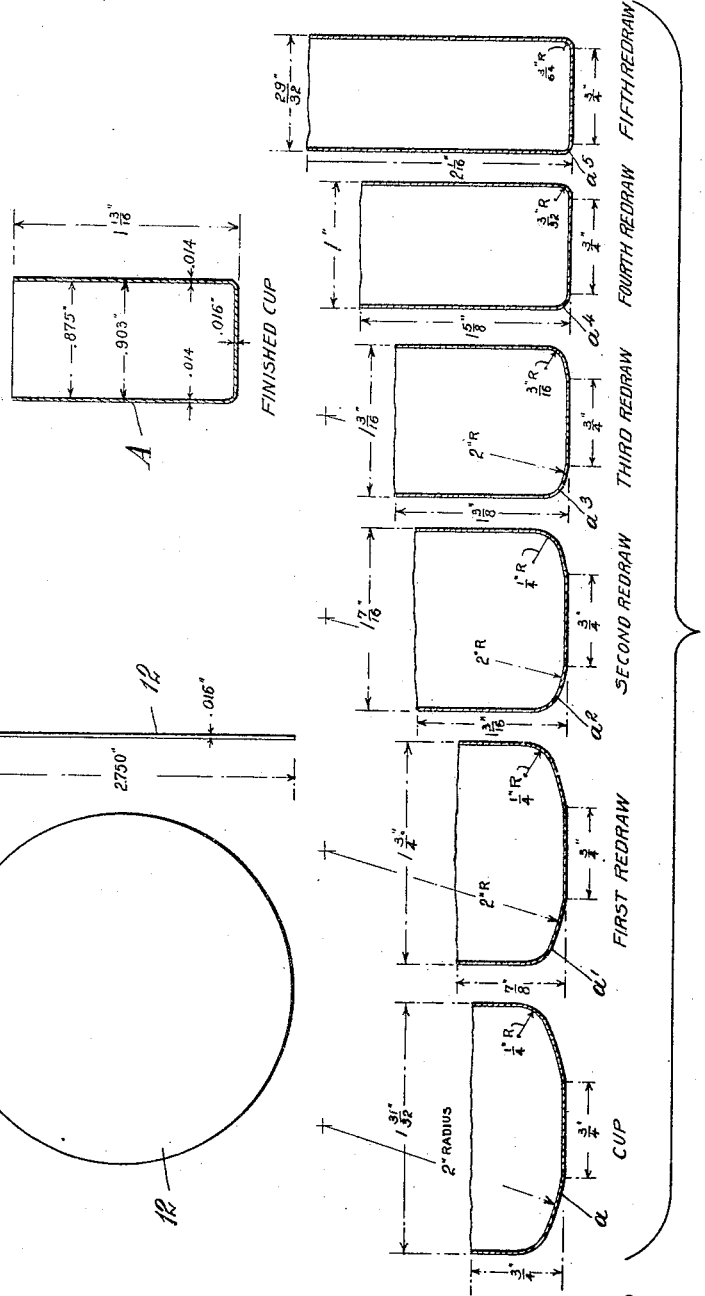

UNITED STATES PATENT OFFICE.

LORENZ MAISEL, OF MADISON, WISCONSIN, ASSIGNOR TO BURGESS BATTERY COMPANY, OF MADISON, WISCONSIN, A CORPORATION OF WISCONSIN.

PROCESS AND APPARATUS FOR MAKING BATTERY-ELECTRODES.

1,375,305.  Specification of Letters Patent.  Patented Apr. 19, 1921.

Application filed October 11, 1918. Serial No. 257,691.

*To all whom it may concern:*

Be it known that I, LORENZ MAISEL, a citizen of the United States, residing at Madison, in the county of Dane, State of Wisconsin, have invented certain new and useful Improvements in Processes and Apparatus for Making Battery-Electrodes; and I do hereby declare the following to be a full, clear, and exact description of the invention, such as will enable others skilled in the art to which it appertains to make and use the same.

The present invention relates to battery electrodes, and more particularly to electrodes of the cup or container type, the invention comprising certain improvements, hereinafter described at length, in the method of making such electrodes, as well as in the apparatus for carrying out the improved method, and the product resulting therefrom.

It is desired to produce an electrode in the form of a seamless, fluid-tight cup or container of wrought zinc, since electrodes of that character completely dispense with the usual soldered joints which are objectionable both because of the expense of soldering, and because of the local action which is apt to take place at the points where the solder comes into contact with the corrosive electrolyte of the battery.

According to the invention, as preferably practised, a sheet or ribbon of zinc is fed across the surface of an annular die, between the latter and the movable punch arranged thereabove. The punch, on descending, coöperates with the die in stamping or cutting out a circular blank of zinc, which is clamped between the punch and a pressure ring located within the die. As the punch continues to descend, the pressure ring yields, and itself moves downward at the same rate of speed as the punch, thus maintaining a uniform pressure upon the blank which remains gripped between the ring and punch and is drawn out and ironed into cupped or dished form by the action of a preliminary-shaping plunger. The latter is disposed within the aforesaid ring and is caused to gradually enter the punch consequent upon the sinking of the ring, the shaping operation terminating when the ring reaches the limit of its downward movement. The parts then commence their ascent, and at the conclusion thereof, the blank which is at that time in the form of a relatively-wide, shallow cup, is removed from the die and thereafter subjected to a re-shaping action, which is repeated until the cup has finally been ironed out and elongated into a cylinder or tube of the required length and diameter. This action is effected by means of pairs of coöperating dies and plungers, the diameters of the working portions of the dies and, hence, the diameters of the plungers, decreasing with each succeeding pair. The dies are each provided with an interior, circumferential ledge or shoulder, forming a constricted throat through which the work is forced by the plunger, the lower edge of the shoulder serving as a stripper to remove the work from the plunger as the latter ascends. The ironing action, however, affects only the sides and the outer portion of the bottom of the cup, which are thereby slightly thinned, whereas the central portion of the bottom of the cup has the same thickness as the original blank and is left unchanged as to size throughout the several re-shaping actions.

The accompanying drawing shows the preferred form of apparatus for carrying out the improved process above outlined; but it is to be understood that the invention, in so far as it relates to the apparatus, is not limited to the precise structural details represented in said drawing, but, on the contrary, is susceptible of substantial modification, while still embodying the essential features recited in the appended claims.

In said drawing:

Figure 1 is a longitudinal section of the apparatus, taken on line 1—1, Fig. 2, the latter being a plan view of the lower member or element thereof;

Fig. 3 is a view similar to Fig. 1, but showing one of the re-drawing plungers and its associated die;

Figs. 4, 5 and 6 are detail sectional views, showing successive steps in the preliminary shaping or cupping of the blank;

Fig. 7 shows both a face view and an edge view of the blank;

Fig. 8 shows, in vertical section, the shapes which the blank assumes during its successive treatments;

Fig. 9 is a vertical sectional view of the finished cup or container;

Fig. 10 is a vertical sectional view showing a nest of cups arranged so as to disclose the relative changes in size and shape which take place as a result of the successive operations; and Fig. 11 is a vertical sectional view showing the cup or container in use.

Referring more particularly to the drawing, there is shown in Figs. 1 and 2 the form of press which at present seems most suitable for carrying out the preliminary cutting and shaping operations, and which comprises co-acting upper and lower members designated generally 1 and 2; one of said members, in this case, the upper member, being movable with relation to the other, as will be understood. The mechanism for effecting such movement may be of any desired character, and since it forms no part of the actual invention, it has not been illustrated.

The aforesaid upper or moving member or element 1 of the press preferably consists of a hollow, cylindrical punch 3, which is fastened to a cross-head 4 and is provided with an elongated, hollow stem 5 that projects upwardly through an opening in said cross-head, the latter having a pair of depending presser pins 6 fastened to its opposite ends. The punch 3 has disposed within it an ejector 7, the stem 8 of which extends upwardly through and beyond the bore of the punch stem 5 and carries a stop 9 in the form of a collar arranged in said bore to limit the downward movement of the ejector, as hereinafter explained.

The stationary lower element or member 2 comprises a base or bolster 10, upon which is mounted the annular die 11, the construction and arrangement of parts being such that the punch 3, during its working stroke, is caused to enter the die, the co-acting edges of the punch and die serving to cut out a circular blank 12 (Fig. 7) of the proper size from the strip or ribbon 13, of zinc, which is suitably fed between the two press elements. The die 11 incloses a pressure ring 14 which is supported in the upper part of said die by means of a plurality of pins or studs 15, the lower portions of which extend through openings in the base 10 and rest at their ends on a second cross-head 16. The latter is slidably mounted on a depending, vertical rod 17, and is yieldingly supported upon the upper end of a buffer sleeve 18, made of rubber or other suitable material of like character, the lower end of the buffer resting upon a cap or collar 19, which is likewise carried by the rod 17 and is itself supported by a nut 20, or its equivalent. The pressure ring 14 is disposed beneath and in co-axial relation with the punch 3, the two parts having the same, or substantially the same, thickness and diameter and having their confronting edge faces slightly beveled.

The blank 12, when cut from the zinc strip or ribbon 13, initially rests upon the edge face of the ring, and is clamped between said face and the corresponding face of the punch, being held thereby in position to be operated upon by the preliminary shaping plunger 21. This plunger may, as shown, have the form of a block or the like, which is rounded or convexed at its upper end and is provided with a base 22 that rests upon the base 10, the plunger base having openings in register with those in base 10 for the passage of the supporting pins 15 therethrough.

The plunger has a height such that the center of its rounded top face is normally flush with the inner edge of the pressure ring, so that it is prevented from acting on the blank until the said pressure ring has been depressed, as will be understood from Fig. 1. To effect this, the cross-head 16 is provided with a plurality of upright pins 23, one for each pressor pin 6, which project loosely through openings in the base 10 and are disposed exactly in line with the said pins 6, the relative lengths of the pins 23 and 6 being such that they contact with each other just after the cut blank has been clamped between the pressure ring and punch. As the descent of the movable element or member 1 continues, the pressure imposed by the pins 6 upon the tops of the pins 23 will force the cross-head 16 downward, the buffer sleeve 18 buckling at that time. The downward movement of said cross-head 16 permits the ring 14 to move down with it at the same rate of speed as the descending punch 3, due to the engagement of the pins 23 by the presser pins 6, with the result that the pressure exerted upon the blank is maintained constant and uniform. The plunger 21 becomes exposed during the descent of the ring and is, accordingly, enabled to exert its stretching, drawing or ironing action upwardly against the blank, the latter being gradually given a cupped or dished shape; see Figs. 4, 5 and 6.

At the conclusion of the downward movement just described, the movable upper member or device 1 commences its ascent, the shaped blank remaining within the punch, while at the same time the ring 14 and its cross-head 16 are pushed upward, owing to the straightening out or expansion of the buffer 18, which thus acts in a sense as a spring. During this movement, the pressure ring gradually covers the plunger 21 again, and the latter is gradually withdrawn from the punch. The ejector 7 fitted within said punch likewise rises therewith, until the upper end of its stem 8 strikes against a suitable stop (not shown) whereupon the ejector is held stationary during the further movement of the punch, which continues until the stop collar 9 abuts against the bottom wall of the bore of the punch stem 5. When that point is reached, the ejector will occupy a position at or slightly below the lower edge of the punch, forcing out the blank therefrom, the said blank having at that time the cup-like shape represented by the member $a$ at the left-hand end of Fig. 8.

After having been subjected to the preliminary shaping action, the dished blank or cup $a$ undergoes a series of drawing, stretching or ironing actions, each effected by means of a die and coöperating plunger, of which those shown in Fig. 3 are typical. The working portions of each die and plunger have a somewhat greater diameter than those of the succeeding die and plunger, from which it follows that at each succeeding treatment, the side wall and the outer portion of the bottom of the cup are drawn out more and more and proportionately thinned, while at the same time the diameter of the cup is reduced, so that by the time the last re-drawing action has been completed, the cup will have been transformed into a relatively long and narrow tube which is closed at its bottom, as depicted by the member $a^5$ at the right-hand end of Fig. 8, the intermediate stages of such transformation being indicated by the members $a^1$—$a^4$ in that figure. The several drawing operations, however, do not have any thinning action whatever in so far as the central portion of the bottom of the cup is concerned, nor do they affect its size, the bottom of the last re-draw $a^5$ being of the same thickness as the original blank 12 and of the same size as the central portion of the bottom of the cup $a$ and of the several intermediate re-draws as represented in Fig. 8. The side wall of the last re-draw $a^5$ is about two thousandths of an inch thinner than the blank. The final product A represented in Fig. 9, differs from the last re-draw $a^5$ only in that its rough edge has been cut off and that it has, or may have, been subjected to a cleaning treatment of some character.

Reverting to Fig. 3, 24 indicates the re-drawing plunger, which is generally similar in shape to the plunger 21 and has its base 25 fastened to the cross-head 26; and 27 indicates the die which coöperates with said plunger. The said die fits in a seat 28 provided in the bolster 29, and has associated with it a guide or centering ring 30 which rests partly on the lower member and partly on the bolster, this ring having an inner diameter of such a size as to enable the work to fit therein, as represented in Fig. 3, in which figure the work may be assumed to be the cup $a$. The die 27 is likewise annular in form, and its inner wall is provided with a circumferential shoulder or ledge 31, having a convex outer face, the lower edge of the shoulder being beveled and terminating short of the lower edge of the die, so that the shoulder thus forms a constriction or throat at the upper end of the passage 32 in the bolster through which the re-drawing plunger moves. The latter, as will be understood, has a diameter such that it can move through the throat.

As regards the re-drawing operation itself, it may be briefly described as follows: The cup or other work $a$ is fitted in the guide ring 30 and thereby centered with respect of the throat or shoulder 31 and its opening, and to the passage 32, this taking place while the plunger 24 is in its raised position. The plunger then commences its descent, and gradually pushes the work ahead of it through the said throat and into the passage 32, during which time the work is elongated or stretched out and reduced in diameter, due to the pressure exerted against its side wall and the outer portion of the bottom of the cup between the opposed faces of the plunger and throat. This action continues until the plunger completes its descent and starts to ascend, whereupon the beveled edge of the shoulder will engage the upper edge of the work and strip it from the plunger, as the latter moves upward through the throat, the work falling through the passage 32. The operations just outlined are then repeated, each time with a somewhat smaller plunger and die, until the work has been drawn out, ironed or stretched into a cup of the required size, after which the edge of the cup is trimmed off and the cup subjected to any cleaning or other further treatment or treatments which may be desired. The final product A is then fitted out with the carbon electrode, depolarizer and electrolyte in the ordinary manner, and thereafter sealed, as indicated in Fig. 11.

In carrying out the re-drawing operations, the various sets of plungers and dies may be of such character as to permit their interchangeable attachment to, and use on, the cross-head and bolster; or, if desired, all of the sets may be permanently or otherwise attached to the cross-head and bolster for simultaneous use. Still other modes of use may be adopted, if preferred; but since this feature in itself is not involved in the actual invention, illustration and further description thereof are considered unnecessary.

I claim as my invention:

1. The herein-described method of making elongated seamless zinc battery cups of usual dimensions, which consists in subjecting a blank of sheet zinc to a preliminary shaping action while maintaining it under a uniform marginal pressure to convert it into a wide shallow cup, and thereafter subjecting said cup to a series of drawing actions which are distinct from one another and during each of which the sides of the cup are slightly thinned, and the bottom thereof is left substantially unchanged as to thickness and diameter to gradually elongate the cup and simultaneously reduce its diameter.

2. The herein-described method of making elongated seamless zinc battery cups, which consists in subjecting a blank of sheet zinc to a preliminary shaping action while maintaining it under a constant, uniform marginal pressure, to convert it into a wide, shallow cup; and thereafter subjecting said cup to a series of successive drawing actions which are distinct from one another and during each of which the sides of the cup are slightly thinned by a movable body having a convex working face, to gradually elongate said cup and simultaneously reduce its diameter, each succeeding body having a diameter less than that of the preceding one, but the bottom as initially blanked remains substantially unchanged both as to diameter and as to thickness.

3. The herein-described method of making elongated seamless zinc battery cups of usual dimensions, which consists in subjecting a blank of sheet zinc to a preliminary shaping action while maintaining it under a constant, uniform marginal pressure, to convert it into a wide, shallow cup; and thereafter forcing said cup successively through a series of dies having constricted annular throats of successively-decreasing diameters, against which its sides are ironed out and slightly thinned during its passage through the dies, while leaving its bottom in substantially unchanged condition both as to diameter and thickness.

4. The herein-described method of making elongated seamless zinc battery cups, which consists in subjecting a blank of sheet zinc to a preliminary shaping action while maintaining it under a constant, uniform marginal pressure, to convert it into a wide, shallow cup; and thereafter gradually elongating said cup and simultaneously reducing its diameter by forcing it successively through a series of dies having internal, circumferential shoulders of successively-decreasing diameters against which its sides are ironed out and slightly thinned during its passage through the dies, while its bottom is left in substantially unchanged condition.

5. The herein described method of making elongated, seamless zinc battery cups of usual proportions which comprises the steps of punching out a blank from a strip of sheet zinc; subjecting the blank, while maintained under a constant uniform marginal pressure, to a preliminary shaping action by applying pressure vertically against its center so as to iron out said blank into the form of a wide, shallow cup having a flat base conforming in diameter and thickness to that of the finished product; and thereafter subjecting the cup to a series of successive ironing actions, during each of which the central portion of the bottom of the cup is left unchanged in size and thickness, while the outer portion of the bottom is ironed upward and slightly thinned.

6. The herein-described method of making elongated seamless zinc battery cups, which comprises the steps of punching out a blank from a strip of sheet zinc; subjecting the blank, while maintained under a constant, uniform marginal pressure, to a preliminary shaping action by applying pressure vertically against its center, so as to iron it out into the form of a wide, shallow cup; and thereafter subjecting said cup to a series of successive drawing actions which are distinct from one another and during each of which the sides of the cup are slightly thinned and the bottom thereof left substantially unchanged to gradually elongate it and simultaneously reduce its diameter but without withdrawing zinc from the central flat portion of the blank.

7. In a shaping press for making seamless zinc battery cups, the combination of a die, an annular punch movable toward the die to cut out a blank for treatment, a pressure ring fitting within the die and coacting with the punch to grip the blank, means for normally holding said ring in raised position, a shaping plunger fitting within the ring for cupping the blank, and means, separate both from the punch and from the die, for causing a downward movement of said ring against the action of its holding means at a constant relative speed during the working stroke of the punch, maintain substantially uniform, marginal pressure on the blank during exposure of the plunger for action upon the blank.

8. In a shaping press for making seamless zinc battery cups, the combination of a die, an annular punch movable toward the die to cut out a blank for treatment, a pressure ring fitting within the die and coacting with the punch to grip the blank, means for normally holding said ring in raised position, a shaping plunger fitting within the ring for cupping the blank, and a pair of coöperating pressure devices, one of which is connected to move with the plunger, for causing a downward movement of the other end of said ring against the action of its holding means at a constant relative speed during the working stroke of the punch to limit the marginal pressure on said blank during exposure of the plunger for action upon the blank.

9. In a shaping press for making seamless zinc battery cups, the combination of a die, an annular punch movable toward the die to cut out a blank for treatment, a pressure ring fitting within the die and coacting with the punch to grip the blank, a shaping plunger fitting within the ring for cupping the blank, a yielding support for said ring normally holding it in raised position, and means separate from said punch but movable with it for forcibly depressing said support during the working stroke of the punch to enable the ring to descend at a constant relative speed as the support moves downward and thereby expose the plunger for action upon the blank without sensibly increasing the marginal grip of said die and ring on said blank.

10. In a shaping press for making seamless zinc battery cups, the combination of a die, an annular punch movable toward the die to cut out a blank for treatment, a pressure ring fitting within the die and coacting with the punch to marginally grip the blank, a shaping plunger fitting within the ring for cupping the blank, a spring-pressed support for said ring normally holding it in raised position, and coöperating abutments associated with said punch and with said support for forcibly compressing the spring during the working stroke of the punch to enable the punch and ring to descend at the same relative speed while exposing the plunger for action upon the blank, thereby preventing undue increase in marginal pressure on the blank and obviating tearing of the zinc.

11. In a shaping press for making seamless zinc battery cups, the combination of a die, an annular punch movable toward the die to cut out a blank for treatment, a pressure ring fitting within the die and coacting with the punch, to grip the blank, a shaping plunger fitting within the ring for cupping the blank, a yielding support for said ring normally holding it in raised position, and alined pins connected with the punch and with a support and engageable with each other during the working stroke of the punch for forcibly depressing the support to enable the ring thereafter to descend at the same speed as the punch and thereby progressively expose the plunger for action upon the blank without substantially increasing the marginal pressure on the blank.

12. In a shaping press for making seamless zinc battery cups, the combination of a die, an annular punch movable toward the die to cut out a blank for treatment, a pressure ring fitting within the die and coacting with the punch to grip the blank, means for normally holding said ring in raised position, a shaping plunger fitting within the ring for cupping the blank, and means other than the punch and operated by the working movement of the punch for effecting backward movement of said ring on said plunger against the action of the ring holding means to expose the plunger for action upon the blank.

13. In a shaping press for making seamless zinc battery cups, the combination of a die; a movable annular punch coöperative therewith to cut out a blank for treatment, a a carrier for said punch; a pressure ring fitting within said die and co-acting with said punch to marginally grip the blank, a spring-mounted support normally holding said ring in raised position, a shaping plunger fitting within said ring for cupping the blank while so gripped, and coacting abutments on said carrier and said support, respectively, for forcibly depressing said support to compel said ring and said punch to move downward at the same speed and thereby progressively expose said plunger for action on said blank without sensibly increasing the marginal grip of said die and ring on said blank.

14. In a shaping press for making seamless zinc battery cups, the combination of a die; a movable annular punch coöperative therewith to cut out a blank for treatment; a carrier for said punch; a pressure ring fitting within said die and co-acting with said punch to marginally grip the blank; a yieldingly-mounted support normally holding said ring in raised position; a shaping plunger fitting within said ring for cupping the blank while so gripped; and pins mounted on said carrier and support for engagement with one another after the blank has been cut out and gripped to thereby depress said support and lower said ring and thus progressively expose said plunger for action on said blank without increasing the marginal grip on the blank.

15. In a shaping press for making seamless zinc battery cups, the combination of coacting upper and lower annular members adapted to marginally grip a blank of sheet zinc between them; a yielding support for the lower gripping member to normally hold it in raised position; a fixed, shaping plunger disposed within said lower gripping member for cupping said blank; and co-acting abutments for moving both gripping members downward at the same speed while still gripping the blank, to expose said plunger for action on said blank without sensibly increasing the marginal grip on the blank.

In testimony whereof I affix my signature.

LORENZ MAISEL.